United States Patent [19]

Shimizu et al.

[11] Patent Number: 4,539,395

[45] Date of Patent: Sep. 3, 1985

[54] FILM-FORMING COMPOSITION COMPRISING CHLORINATED POLYALKYLENE GLYCOL

[75] Inventors: Kazuo Shimizu; Yoshiji Masaoka, both of Iwakuni; Mutsuro Takaoka, Yamaguchi, all of Japan

[73] Assignee: Sanyo Kokusaku Pulp Co., Ltd., Tokyo, Japan

[21] Appl. No.: 573,994

[22] Filed: Jan. 26, 1984

[30] Foreign Application Priority Data

Apr. 21, 1983 [JP] Japan .................................. 58-70719

[51] Int. Cl.$^3$ ............................................. C08G 65/48
[52] U.S. Cl. ....................................... 528/425; 525/50
[58] Field of Search ............................ 528/425; 525/50

[56] References Cited

U.S. PATENT DOCUMENTS 3,236,786  2/1966  Newkirk et al. .................... 528/425

Primary Examiner—Harold D. Anderson
Attorney, Agent, or Firm—Armstrong, Nikaido, Marmelstein & Kubovcik

[57] ABSTRACT

A film-forming composition containing a chlorinated polyolefinglycol as a binder component which is obtained by uniformly chlorinating in solution polyethyleneglycol and/or polypropyleneglycol having a molecular weight not lower than 200 to a chlorine content of 50–75% by weight.

7 Claims, No Drawings

FILM-FORMING COMPOSITION COMPRISING CHLORINATED POLYALKYLENE GLYCOL

DETAILED DESCRIPTION OF INVENTION

This invention concerns a film-forming composition containing as an effective component a product of the chlorination of polyethyleneglycol (hereinafter abbreviated to as PEG) and/or polypropyleneglycol (hereinafter abbreivated to as PPG) With the progress of petrochemistry in recent years the demand for, plastic films such as polypropylene film or polyethylene film, and sheets or moldings of such plastics has been increasing steadily.

With this increase, the demand for printing inks or other film-forming agents applicable to these plastic materials has increased, and hence various studies on the subject have been carried out.

However, as is generally well known, these plastic materials are non-polar substances, and in contrast to paper, they exhibit poor adhesiveness to inks or other film-forming agents. Accordingly, in order to improve the adhesiveness of the printing inks or other film-forming agents, it has been the practice to activate the surface of the above plastic materials to improve its adhesiveness to the ink through treatment of the surface by process such as corona discharge treatment, high frequency discharge treatment, chemical treatment with bichromate or the like.

As binders of the printing inks or other film-forming agents for these treated plastic materials, cyclized rubber, polyamide and, nitrocellulose were usually used, but because of unevenness of the treatment and other difficulties, even when applied to the aforesaid treated films, these binders are not satisfactory. Also, in recent years, chlorinated polypropylene soluble in aromatic solvents has appeared as a binder having a good adhesiveness, but it exhibits little solubility in aliphatic solvents or alcohols, and hence, its application has been limited as a binder used for film-forming agent in printing inks or the like.

We have investigated from different angles to overcome the defects of the film-forming compositions used in printing inks or the like for use on the surface of the above-mentioned publicly known polyolefins, and have found that the compositions of the invention have an excellent adhesiveness as the film-forming compositions used in printing inks or the like for polyolefins, and have completed the present invention. The film-forming compositions of the invention contain as binder components the products of the uniform chlorination of PEG, PPG or mixture thereof dissolved in a chlorine-resistant solvent to a chlorine content of 50 to 75% by weight, based upon the weight of the chlorinated products. The molecular weight of said PEG or PEG should be above 200. As these chlorinated products are soluble in aliphatic solvents or alcohols as well as in aromatic solvents, they may be applicable either as film-forming compositions used in printing inks or the like for polyolefins, polyesters and others or as modifiers of the hitherto known film-forming agents used in printing inks or the like.

With regard to the chlorination of PEG or PPG, none of the physical properties of the chlorinated products have been known up to this time, except for a report which describes that high degrees of chlorination may be possible in the dark at room temperature using polyazine containing a conjugated system as a catalyst.

As a result of extensive experiments on the chlorination of PEG or PPG, we have discovered that uniformly chlorinated products having a chosen chlorine content can be obtained by passing the chlorine gas through a carbon tetrachloride solution in which PEG or PPG is completely dissolved, with or without the application of pressure. Moreover, by inspecting their various properties, it was found that, among the uniformly chlorinated polymers mentioned above, those having a chlorine content of 50 to 75% by weight exhibit a particularly therefor desirable adhesiveness to the surface of polyolefins, and that their solubilities were simultaneously superior. On the basis of these findings, we have completed the invention and provide them as film-forming compositions used in printing inks or the like.

In the following, details are given of an application of the invention to the composition of printing ink. Chlorinated PEG and chlorinated PPG of the invention are manufactured as follows. PEG or PPG having a molecular weight of more than 200 is dissolved uniformly into a chlorine-resistant solvent such as carbon tetrachloride, with or without the application of pressure. Chlorine gas is passed through this solution to a point where the chlorine content exceeds 50% by weight maintaining a uniformly dissolved state from beginning to end. The reaction proceeds smoothly and is over in a short period, if an organic peroxide, a diazo compound or other compounds used generally as a catalyst for chlorination is present, or ultraviolet rays or if radiation are employed as catalysts. The reason why the molecular weight of PEG or PPG is restricted to above 200 is due to the fact that, if the molecular weight is less than 200, the resulting chlorinated product is so tacky that the drying property of the printing ink using this chlorinated product becomes inferior. The chlorine content must be within a range of 50 to 75% by weight because a chlorine content lower than 50% by weight, results is poor storage stability of the product, and 75% by weight is the upper limit of chlorination.

The chlorinated polymers obtained through the uniform chlorination in a chlorine-resistant solvent as described above do not need to be isolated, and the solvent may be displaced with a chosen solvent (for example, combinations of aromatic solvents aliphatic solvents, alcohols or the like) by direct solvent displacement to convert to binder solutions in solvents for printing inks. Suitable on the other hand, the chlorinated polymers may be isolated from the chlorine-resistant solvent by steam distillation and then dissolved into the chosen solvent.

In the following, the invention is illustrated by examples, but the scope of the invention is not limited to the examples.

EXAMPLE 1

400 g of PEG having a molecular weight of 300 or 20,000 was uniformly dissolved into 10 liter of carbon tetrachloride under the conditions of temperature of 110° C. and pressure of 2 kg/cm$^2$. After air purging, it was chlorinated by introducing chlorine in gas from the bottom of the reaction vessel and irradiating with ultraviolet rays. Chlorinated reaction solutions were drawn out at the desired chlorine content of 50 to 75% by weight and converted to 80% toluene solutions by the solvent displacement method.

EXAMPLE 2

400 g of PPG having a molecular weight of 4,000 was uniformly dissolved into 10 l of carbon tetrachloride at a temperature of 78° C. under atmospheric pressure. After air-purging, it was chlorinated by introducing gaseous chlorine from the bottom of the reaction vessel and irradiating with ultraviolet rays. Chlorinated reaction solutions were drawn out at the desired chlorine content of 50 to 65% by weight and converted to 80% toluene solutions by the solvent displacement method.

The chlorine content and the solution viscosity measured on the products in Example 1 and 2 are shown in Table 1.

TABLE 1

|  | Example |  |  |  |  |  |  |  |
|---|---|---|---|---|---|---|---|---|
|  | EXAMPLE 1 |  |  |  |  | EXAMPLE 2 |  |  |
|  | PEG (M.W. 300) |  | PEG (M.W. 20000) |  |  | PPG (M.W. 4000) |  |  |
| Measurement | A | B | C | D | E | F | G | H |
| Chlorine Content (%) | 53.2 | 63.8 | 52.3 | 65.9 | 70.4 | 50.8 | 60.5 | 65.0 |
| Solution Viscosity (CPS) | 290 | 200 | 1440 | 890 | 760 | 570 | 410 | 350 |

Solution viscosity: Viscosity of 80% toluene solution in centipoise at 25° C.

EXAMPLE 3

Using Samples A, D or G in Example 1 or 2 mentioned above, gravure ink was prepared according to the following formulation.

| | |
|---|---|
| Varnish (A, D or G in Example 1 or 2) | 30 |
| Pigment (Carmine 6BN) | 10 |
| Solvent (toluene) Corrective quantity for a fixed viscosity | $\dfrac{a}{40 + a}$ |

(Note)
Carmine 6BN: from Toyo Ink Manufacturing Co.

After milling for 2 hours with sand mill, the viscosity was adjusted to 20±2 seconds by using zahn cup No. 5. Each ink was coated individually on the plastic films to form a 5 to 7μ ink film. After drying sufficiently at room temperature, a performance test was carried out. Results are shown in Table 2 which includes results obtained with comparative Examples, (cyclized rubber and chlorinated polypropylene).

TABLE 2

|  | Physical Property |  |  |  |  |  |  |  |  |
|---|---|---|---|---|---|---|---|---|---|
|  | Difficulty in inking | Storage-stability of ink | Oil resistance of ink | Adhesiveness 4 |  | Resistance to crumpling 5 |  | Blocking property 6 |  |
| Sample | 1 | 2 | 3 | PP | PET | PP | PET | PP | PET |
| Example |  |  |  |  |  |  |  |  |  |
| A | Easy | Normal | Excellent |  |  |  |  |  |  |
| D | " | " | " |  |  |  |  |  |  |
| G | " | " | " |  |  |  |  |  |  |
| Comparative Example |  |  |  |  |  |  |  |  |  |
| Cyclized rubber | " | Apt to galation | Bad | X | X | X | X | X | X |
| Chlorinated polypropylene | " | Apt to galation | Good |  | X |  | X |  | X |

EXAMPLE 4

Varnish for gravure printing having the following composition was prepared by the addition of B, C, F or H in Example 1 or 2 mentioned above to a nitrocellulose varnish.

| | |
|---|---|
| Chlorinated product (B, C, F or H in Example 1 or 2 or chlorinated polypropylene) | 0.8 |
| Nitrocellulose (H ½) | 2.0 |
| MEK | 9.0 |
| Toluene | 5.6 |
| IPA | 3.6 |
| | 21.0 |

After blending homogeneously, each varnish was coated on the plastic films to form a 5 to 7μ film thickness. This was dried sufficiently at a room temperature and a performance test was carried out. Results are shown in Table 3.

TABLE 3

|  | Physical property |  |  |  |  |  |  |  |  |
|---|---|---|---|---|---|---|---|---|---|
|  | Difficulty in making varnish | Storage stability of varnish | Oil-resistance of varnish | Adhesiveness 4 |  | Resistance to crumpling 5 |  | Blocking Property 6 |  |
| Sample | 1 | 2 | 3 | PP | PET | PP | PET | PP | PET |
| Example |  |  |  |  |  |  |  |  |  |
| B | Easy | Normal | Excellent |  |  |  |  |  |  |
| C | " | " | " |  |  |  |  |  |  |
| F | " | " | " |  |  |  |  |  |  |
| H | " | " | " |  |  |  |  |  |  |
| Comparative Example |  |  |  |  |  |  |  |  |  |
| Chlorinated Polypropylene | " | Seperate | — | — | — | — | — | — | — |

TABLE 3-continued

| | Physical property | | | | | | | |
|---|---|---|---|---|---|---|---|---|
| | Difficulty in making varnish | Storage stability of varnish | Oil-resistance of varnish | Adhesiveness 4 | | Resistance to crumpling 5 | | Blocking Property 6 |
| Sample | 1 | 2 | 3 | PP | PET | PP | PET | PP | PET |
| Nitrocellulose varnish | — | — | Excellent | Δ | X | Δ | X | | |

Conditions and judgement are the same as those in Example 3

EXAMPLE 5

Comparison of the solubility into toluene/alcohol solvents:

| | Toluene/Ethanol | | | |
|---|---|---|---|---|
| Sample | 9/1 | 8/2 | 7/3 | 5/5 |
| G in Example 2 | clear | clear | clear | slightly cloudy |
| Chlorinated Polypropylene | clear | slightly cloudy | deposit | deposit |

Chlorinated polypropylene used is the same as that in Example 3

From the results in Example 3, 4 and 5 mentioned above, the polymers of this invention were found to have an excellent adhesiveness and solubility into solvents. Such polymers were never recognized in the past as suitable for printing ink compositions for use on polyolefins.

What is claimed is:

1. A film-forming composition comprising a chlorinated polyalkyleneglycol binder produced by chlorinating a polyalkyleneglycol having a molecular weight of not less than 200 and selected from the group consisting of polyethyleneglycol, polypropyleneglycol and mixtures thereof in a solution of the polyalkyleneglycol in a chlorine-resistant solvent, to a chemically combined chlorine content of 50 to 75% by weight, based upon the weight of the produced chlorinated polyalkyleneglycol, wherein said polyalkyleneglycol binder is soluble in alcohols, aliphatic solvents and aromatic solvents.

2. The film-forming composition according to claim 1, wherein a catalyst is employed in the chlorination reaction.

3. The film-forming composition according to claim 2, wherein said catalyst is selected from the group consisting of organic peroxides, and diazo compounds.

4. The film-forming composition according to claim 1, wherein the chlorine-resistant solvent is carbon tetrachloride.

5. The film-forming composition according to claim 1, wherein, following the chlorination reaction, the chlorine-resistant solvent is replaced by a desired solvent through a direct solvent displacement process.

6. The film-forming composition according to claim 1, wherein, following the chlorination reaction, the chlorinated polyalkyleneglycol is separated from the solvent by steam distillation, and then dissolved into a desired solvent.

7. The film-forming composition according to claim 2, wherein said catalyst is ultraviolet radiation.

* * * * *